Oct. 10, 1961 L. E. McDUFF 3,003,902
FLEXIBLE CONTAINED INSULATION BLANKET
Filed May 11, 1956 2 Sheets-Sheet 1

INVENTOR.
Leon E. McDuff
BY Nobbe & Swope
ATTORNEYS

Oct. 10, 1961 L. E. McDUFF 3,003,902
FLEXIBLE CONTAINED INSULATION BLANKET
Filed May 11, 1956 2 Sheets-Sheet 2
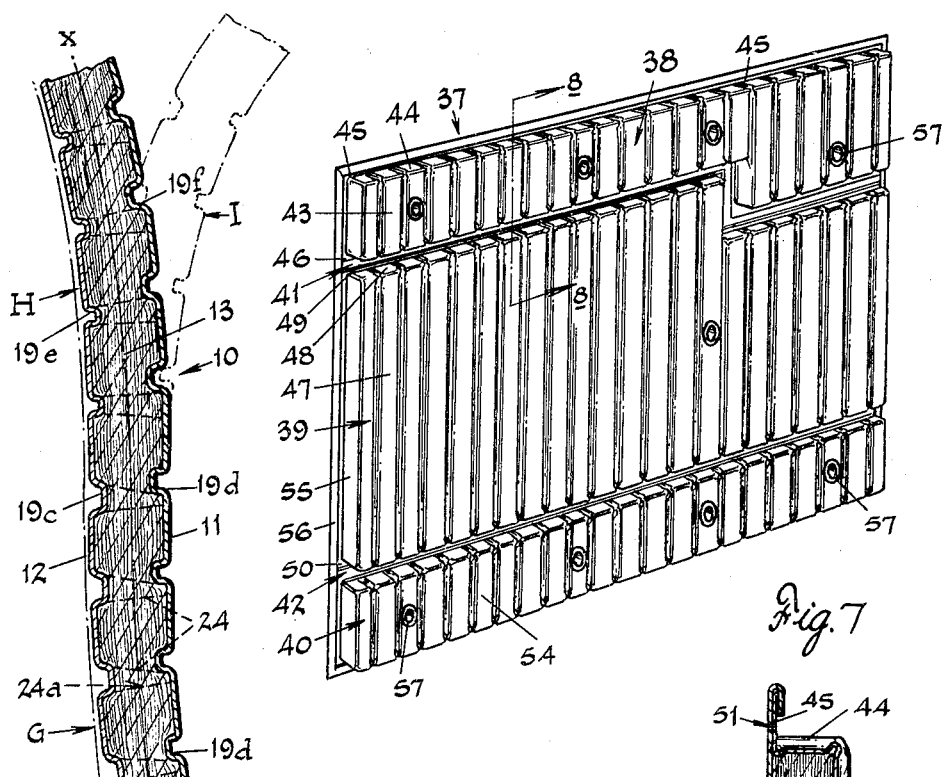
Fig. 5
Fig. 7
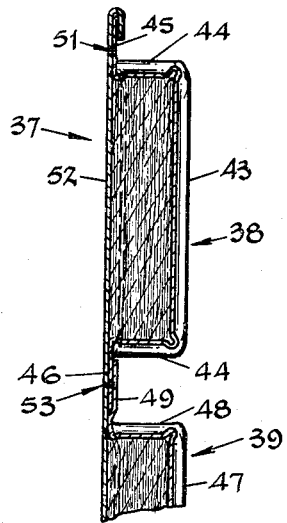
Fig. 6.
Fig. 8
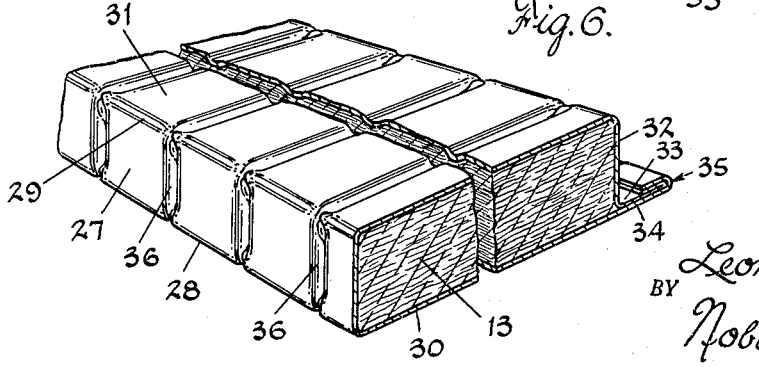
INVENTOR.
Leon E. McDuff
BY
Nobbe & Swope
ATTORNEYS

United States Patent Office 3,003,902
Patented Oct. 10, 1961

3,003,902
FLEXIBLE CONTAINED INSULATION BLANKET
Leon E. McDuff, Reseda, Calif., assignor, by mesne assignments, to Johns-Manville Fiber Glass Inc., Cleveland, Ohio, a corporation of Delaware
Filed May 11, 1956, Ser. No. 584,237
1 Claim. (Cl. 154—44)

The present invention relates broadly to insulation units of contained fibrous material, and more particularly to a flexible, sheathed insulation unit that may be readily shaped to a curved or contoured surface of installation, and to a method of making such a unit.

It is preferable that insulation blankets of the type used to insulate curved surfaces be flexible enough to follow a surface of reversing curvature. In many instances, it is also desirable that such blankets be provided with a metallic sheath which prevents gases or moisture from penetrating the insulating materials and being absorbed thereby. This is particularly true when the blanket is to be used around internal combustion engines since corrosive gases which are exhausted from the engines adversely affect most insulation materials. However, when the blankets are used in aircraft, the metallic sheath which encases and seals the same must be sufficiently light to fall within the weight specifications and yet provide a substantially rigid and sealed container for the insulation material.

Therefore, an important object of the present invention is to provide an improved metallic sheathed flexible insulation blanket which is readily conformable to a curved or contoured surface, and a method of making such a blanket.

Another object of the invention is to provide a metallic sheathed blanket of fibrous insulation material wherein the fibrous material is in contact with the inner walls of the metal sheathing and the sheathing has integrally formed hinges adapting the blanket to curved or contoured surfaces.

A further object of the invention is to provide a method of making such a flexible blanket in which the fibrous insulation material is compressibly urged into contact with the metal sheathing.

Other objects and advantages of the invention will become more apparent during the course of the following description, when taken in connection with the accompanying drawings.

In the drawings, wherein like numerals are employed to designate like parts throughout the same:

FIG. 5 is a cross-sectional detail view of an insulation blanket when curved in an installed position;

FIG. 6 is a fragmentary perspective view of a modified form of insulation blanket;

FIG. 7 is a perspective view of one form of insulation blanket constructed in accordance with the embodiments of the invention; and FIG. 8 is a transverse, sectional view of the blanket shown in FIG. 7 as taken on line 8—8 of that figure.

Figure 1:
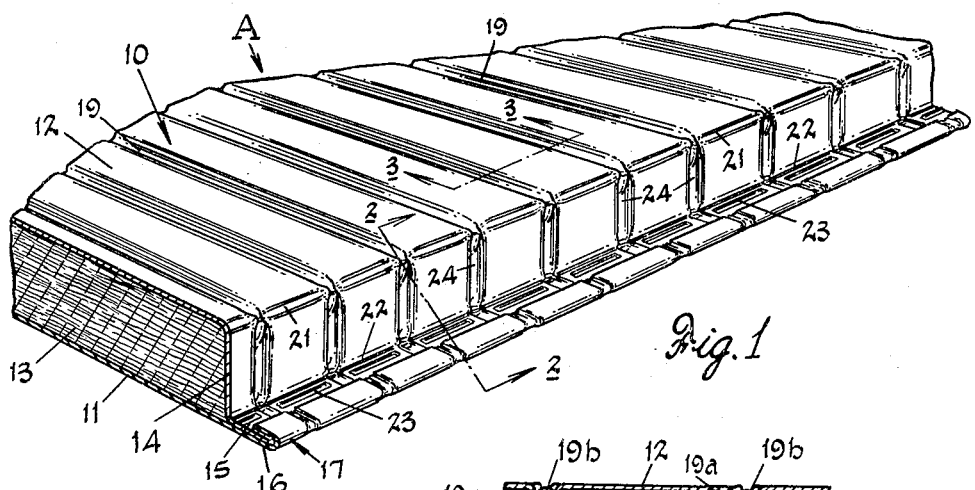
FIG. 1 is a fragmentary perspective view of an insulation blanket constructed in accordance with the present invention.

With reference now to the drawings, there is shown in FIG. 1 an insulation blanket A comprising a metallic sheath or cover 10 having outer panels 11 and 12 with a contained filler 13 of fibrous material. While several forms of mineral fiber may be employed to advantage, it has been found that a dense layer of felted glass fibers provides a superior, fire-proof insulation material and, as will be later set forth, the felted nature of the fibers in combination with the novel casing construction provides a greatly improved insulation blanket.

Satisfactory felted layers of glass fibers may be formed by suspending the glass fibers in water and then flowing the suspension onto a screen in the manner used to make paper. The resultant layer of fibers is quite dense and has the general characteristics of a thick layer of soft paper. Such a fibrous felt provides an extremely effective barrier to sound and has a low thermal conductivity which renders the same highly advantageous for use as insulation.

Figure 2:
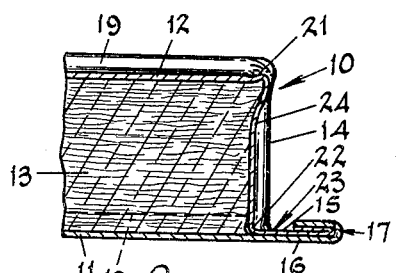
FIG. 2 is a transverse sectional view through the blanket taken on line 2—2 of FIG. 1.
Figure 3:
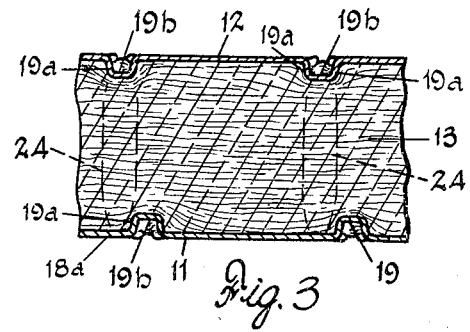
FIG. 3 is a longitudinal section view taken on line 3—3 of FIG. 1.

As shown in FIGS. 1 to 3, a mat of felted glass fibers 13 is retained between the spaced sheets 11 and 12 and the sheet 12, along its side margins, is bent at the edges of the mat to form substantially vertically disposed side walls 14 and outwardly directed marginal flanges or edges 15. The marginal edges 15 overlie the marginal edges 16 of the sheet 11 and are joined thereto by folding both of said edges tightly upon one another to form an effective edge seal as at 17. And, as will be hereinafter described, similar sealed edge margins are produced at the ends of the blanket when completed.

Figure 4:
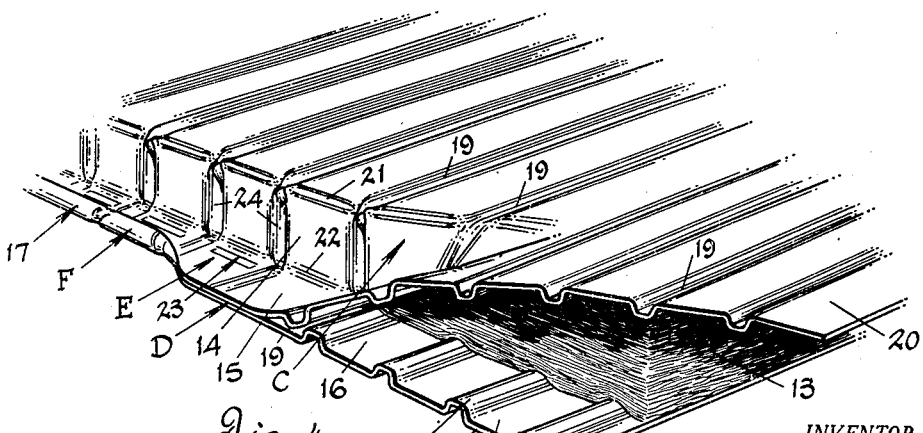
FIG. 4 is a diagrammatic perspective view illustrating in a general manner the steps followed in preparing the sheath for the blanket.

Preparatory, however, to the above-described assembly of the blanket A, a strip or ribbon of thin yet substantially stiff metal, preferably stainless steel or Inconel having a thickness in the order of .002 to .004 inch, is passed through a suitable die or crimping rolls to impress equi-spaced transversely disposed grooves 19 therein which, as will be later described, act as hinges and render the blanket flexible. As shown in FIG. 4, a desirable length of this grooved sheet metal 18 (to form one side 11 of the blanket 10) is then placed upon a support so that the grooves 19 therein will project upwardly as defined ridges. The felt of glass fiber material 13 is then laid upon the sheet 18 with the lay of the fibers parallel to said sheet, and a second similarly grooved metal sheet 20 (to form the opposite side 12 of the blanket 10), of greater width than the sheet 18, is then placed upon the mat with the grooves 19 thereof directed downwardly. With the metal sheets thus positioned, the grooves in each are directed inwardly and compress the felted fibers along the lines of contact therewith.

As shown in FIGS. 2 and 3, the grooves 19 are substantially rectangular in cross-sectional view and have substantially vertical side walls 19a integrally joined to one another by a bottom wall 19b disposed substantially at right angles thereto. It will be readily understood that the substantially rectangular configuration of the grooves 19 provides an ideal hinging action between the side walls 19a and the base 18a, and between the bottom wall 19b and the side walls 19a of the groove 19.

As shown in FIG. 4, and from the preliminary laid-up relation as at B, the sheets 18 and 20 with the fiber mat 13 disposed therebetween may then be passed through a suitable rolling machine or press that is provided with contoured rolls whereby the sheets 20 is bent or folded downwardly along each of its opposite margins slightly inwardly of the ends of the fiber mat 13, as at C, to form the laterally turned, integral side wall portions 14 and the outwardly directed flanges 15 at the outermost ends of the walls 14. In so forming the wall portions 14, the adjacent ends of the mat 13 are engaged by the downwardly and inwardly moving walls 14 prior to said walls reaching their substantially vertical position, and the slight amount of additional movement of the walls 14 compresses the mat therebetween so that, as shown in FIG. 2 the fibers are bearing firmly against metal in the corners of the completed blanket and the mat 13 is compressed into contact about the peripheries of the grooves 19 formed in the sheets 18 and 20. Since the lay of the fibers is parallel to the plates 18 and 20, the walls 14 exert pressure on the ends of the fibers which in turn buckle somewhat under compression. This buckling action tends to force portions of the mat into relatively tight contact with all portions of the inner walls of the cover sheets and prevent formation of hot or cold spots therein.

After the walls 14 are bent to their final position, the flanges 15 overlay the marginal edge portions 16 of the sheet 18 and are then rolled to somewhat flatten, as at D, the portions of the grooves 19 formed therein. Since the bent corner areas 21 and 22 of the side walls 14 have a slight tendency to straighten and allow the walls to move outwardly due to the pressure exerted thereon by the mat 13, the sheet portions 15 and 16 are secured in position by spot welding them to one another, as at E, along a series of spaced lines 23 which serve to retain the walls 14 in their permanent substantially vertical position.

The extreme or marginal edges 15 and 16 of the sheets 18 and 20 are then acted upon by suitable bending and shaping members, or rolls, to bend and fold the same upwardly and over one another into a tightly folded and sealed relation as indicated at F. The welded areas and the progressive folding of the marginal edges are believed to provide side edges for the blanket of increased strength thereby affording ample flanged areas for installation of the blanket without sacrificing its structural strength or unitary sealed condition. Also, the portions 24 of the grooves 19 in the wall portions 14 increase the strength thereof to resist collapsing pressures.

As shown in FIG. 5, end walls 25 for an insulation blanket A are bent from the sheet 12 when the desired length for said blanket has been determined. As hereinbefore described, the sheet 12 in its end margins is bent downwardly and then outwardly after which the extreme edges of the sheets 11 and 12 are folded to seal the blanket. As well, the flange 26 thus formed can be spot-welded to seal the sheets together.

It was previously mentioned that the grooves 19, because of their rectangular shape, operate as ideal hinges. Since the grooves 19 are formed in both cover sheets 11 and 12, shaping of the insulation blanket to a reverse curve is readily accomplished since the grooves of the cover sheet, in tension, open outwardly to allow the sheet to literally stretch while the grooves of the opposite sheet which normally is in compression fold inwardly to allow the sheet to contract without crimping or buckling thereof. This condition becomes readily apparent when a completed insulation unit is flexed or bent into conformity with the curved wall of an airplane.

Thus, where the blanket is curved into conformity with the wall surface indicated at G, in broken line, the grooves 19c of the sheet 12 open to allow the sheet to linearly stretch relative to the neutral axis $x$—$x$ of the blanket. Conversely, oppositely disposed areas of the sheet 11, upon being shaped to conform to the same curvature, must contract relative to the neutral axis $x$—$x$ which contraction is effected by the grooves 19d closing or collapsing inwardly as they are each proportionally and slightly compressed.

Now, in following a reversely curved wall portion, as indicated at H, the grooves 19 in sheets 11 and 12 will be reversely affected in their extended and collapsed relationship. Thus, the grooves 19e in sheet 12 will substantially close to accomodate for contraction in this area of the sheet while the grooves 19f in sheet 11 will correspondingly become expanded. Since either and each side surface of the blanket is adapted to elongate or foreshorten in its overall length, no special handling of the blanket is required during its installation.

Also, as shown in FIG. 5, by the broken lines I, the sheet 11 of a blanket A, by means of its grooved areas 19, can as easily be progressively foreshortened according to the arc of one curvature or of a compound curvature whereby the general curvature is more elliptical than generated by one radius. Within the limitation of complete closure of the plurality of the grooves upon themselves on the contracted side, an insulation blanket may be shaped into conformity with any functionally shaped surface.

As shown in FIGS. 1 and 4, the substantially right-angled relationship of the bottom walls 19b of the grooves 19 as they join and form an extension of one another, at the wall corners 21 and 22, allows these corners to open and close in a typical accordion or bellows fashion to sustain or compensate for the irregularity of surface area imposed throughout the side walls 14. This irregularity of surface area in the side walls 14 is, of course, produced by the elongation along one corner area with a complementary foreshortening along the opposite corner area which is created by the lengthening of one plane surface or panel with consequent shortening of the opposite plane surface or panel. Thus, as shown in FIG. 5, opening of the grooved portions 24 of the walls 14 and adjacent the panel 12 will occur as indicated in dotted lines at 24a as the sheet 12 is shaped into agreement with a wall surface as indicated at G, while opposite ends of each groove 24 in the vicinity of panel 11 will correspondingly collapse as indicated at 24b.

Of course, where an insulation blanket is shaped to the general curvature of the indicated areas G and H (FIG. 5), this substantially wedge-shaped opening of the grooved portions 24 of the walls 14 will be alternately reversed throughout the length of the walls 14 as the blanket is progressively curved into conformity with a wall surface having a reversed curvature. This provision of spaced grooves in the walls 14 as well as the surface panels 11 and 12 permits a permanently sealed insulation blanket to be employed in a variety of structural circumstances where by the contour of an outer surface, as for example of an airplane, a curvature is created in one linear dimension and where heretofore the installation of a metal sheathed insulation unit would not be possible without unsightly buckling or rupture.

In FIG. 6, there is illustrated a modified means for enclosing the insulation material 13 while employing an outer metallic sheath or covering that is constructed basically in a manner similar to that described in connection with FIGS. 1 to 4 inclusive. It will be recalled that in the previous form of blanket, the outer panels 11 and 12 were provided in the form of individual sheets having transversely disposed grooves 19. The margins along the longitudinal sides were then bent downwardly and then outwardly to form the walls 14 and side margins which were sealed as at 17. As shown in FIG. 6, the cover or sheath for the modified type of blanket is constituted by one continuous sheet in which a side wall 27 is initially produced by bending the sheet along two parallel areas and as at 28 and 29 so that the wall 27 is an integral portion of both panels.

After insertion of the glass fiber insulation material 13, the margin of the panel 30 is then processed as shown in FIG. 4, or, in other words, is bent to create a side wall 32 equal in height to wall 27 and an outwardly directed marginal edge 33 which is then affixed to the adjoining margin 34 and therewith folded over to form the edge seal 35.

Since the manner of creating the several corners of either embodiments of the invention is typical, one of the other, the grooves 36 in the integral side wall 27 are adapted to expand and collapse accordion-wise in a manner similar to that noted in connection with the grooves 24 and to compensate for the elongation of one surface panel while the opposite surface is being subjected to foreshortening. It will therefore become evident that, without departing from the spirit of the invention, an insulation blanket can be afforded and employed to similar advantage under differing circumstances of installation.

One typical form of insulation blanket that may be fabricated according to the embodiments of this invention is shown by way of illustration in FIG. 7. As therein shown, the blanket 37 has a plurality of individually formed insulation areas as at 38, 39 and 40 which are defined by channel areas 41 and 42.

According to this particular construction, each of the cover sheets of these areas and the insulation material thereof will be pre-shaped and then affixed as heretofore described to an oppositely disposed, unitary cover sheet by placing the outwardly directed flanges in surface or overlaying contact and spot-welding the necessary areas. More particularly, and as shown in detail in FIG. 8, a cover panel or sheet 43 for the area 38 will have vertically disposed walls 44 and outwardly directed marginal flanges 45 and 46. Likewise, the cover panel or sheet 47 for the area 39 will be provided with walls 48 and flanges 49 and 50.

Now, when the parts are arranged as shown in FIG. 8, a line of spot welds as at 51 along one side will affix the sheet 43 to the opposite cover sheet 52 along the flange 45. Along oppositely disposed flange 46, the line of welds 53 will secure not only the flange 46 to the sheet 52 but also the flange 49 of the sheet 47. In a like manner, the flange 50 of sheet 47 and the adjacently located flange of the sheet 54 for the area 40 will be affixed to the sheet 52. When the several sheets 43, 47 and 54 have been secured by welding to the sheet 52, the end walls, one of which is indicated generally at 55, may be formed and the peripheral edges folded over as at 56 and as previously set forth.

While forming no part of this invention, tubular elements, indicated at 57, may be employed throughout any insulation unit, of which the blanket 37 is typical, for the purpose of inserting mounting bolts or the accommodation of necessary piping therethrough.

It is to be understood that the form of the invention herewith shown and described is to be taken as a preferred embodiment of the same, and various changes may be resorted to without departing from the spirit of the invention or the scope of the subjoined claim.

I claim:

A flexible metal-clad insulation unit, comprising spaced metallic cover sheets, a layer of fibrous material filling the space between the cover sheets, one of said sheets having a base portion and laterally turned side walls terminating in outwardly directed marginal portions fixedly connected to the marginal portions of the second cover sheet, said first cover sheet having spaced substantially parallel grooves formed in said base portion and in the lateral side walls thereof, said grooves extending generally in a direction substantially perpendicular to said side walls, said second cover sheet also having spaced parallel grooves formed therein extending generally in the same direction as the grooves in said first cover sheet, said grooves in said cover sheets being directed inwardly in opposition to one another, said grooves in said cover sheets being substantially rectangular in transverse cross section whereby expanding and contracting forces will be distributed throughout different areas of the fibrous layer as the unit is flexed, and said first cover sheet having at least one groove formed therein extending in a direction substantially perpendicular to said other grooves, said perpendicularly extending groove being directed inwardly toward said second cover sheet, and portions of said first cover sheet forming the bottom of said groove being in contiguous relationship with portions of said second cover sheet.

References Cited in the file of this patent

UNITED STATES PATENTS

| | | |
|---|---|---|
| 1,910,703 | Le Grand | May 23, 1933 |
| 2,057,071 | Stranaham | Oct. 13, 1936 |
| 2,391,436 | Miskella | Dec. 25, 1945 |
| 2,576,698 | Russum | Nov. 27, 1951 |
| 2,585,082 | Bollinger | Feb. 12, 1952 |
| 2,671,492 | Biordi et al. | Mar. 9, 1954 |
| 2,700,633 | Bovenkerk | Jan. 25, 1955 |
| 2,734,007 | Toulmin | Feb. 7, 1956 |
| 2,745,173 | Jonas | May 15, 1956 |
| 2,747,269 | Atchison | May 29, 1956 |

FOREIGN PATENTS

| | | |
|---|---|---|
| 518,967 | Belgium | Apr. 30, 1953 |